UNITED STATES PATENT OFFICE.

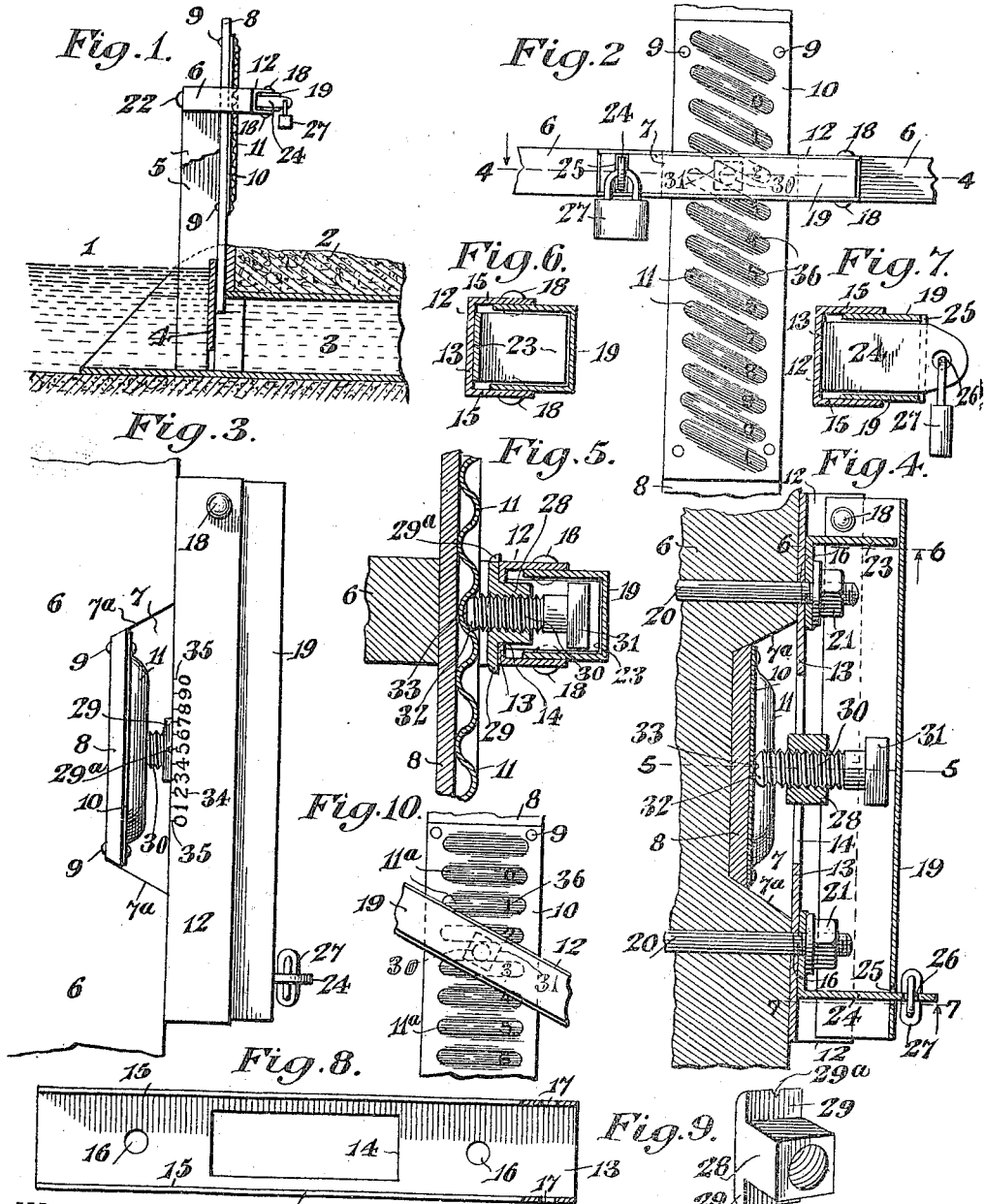

FREDERICK N. CRONHOLM, OF RUPERT, IDAHO.

LOCKING MEANS FOR GATES OF IRRIGATING-CANALS.

1,220,960.  Specification of Letters Patent.  Patented Mar. 27, 1917.

Application filed March 16, 1916. Serial No. 84,690.

*To all whom it may concern:*

Be it known that I, FREDERICK N. CRONHOLM, a citizen of the United States, residing at Rupert, in the county of Minidoka and State of Idaho, have invented a new and useful Locking Means for Gates of Irrigating-Canals, of which the following is a specification.

This invention has reference to locking means for gates of irrigating canals, and its object is to produce locking means whereby accurate adjustments may be made without the possibility of change of the adjustments except the gate be unlocked by an authorized person.

The present invention is an improvement upon that shown and described in Letters Patent No. 1,121,170, granted to me on December 15, 1914, for locking means for gates of irrigating canals.

The present invention provides parallel ribs arranged in a series extending lengthwise of the stem of the gate, together with a fastening screw introducible between the ribs and capable of movement transversely of the direction of movement of the gate stem. The ribs may be either inclined or perpendicular to the length of the stem. The arrangement is such that the spaces between the ribs, when the latter are inclined, all have their lower ends on one side of the stem and their high ends on the other side of the stem with the low end of each space or channel opposite the high end of the next lower space or channel on the opposite side of the stem. The bolt or screw is so mounted as to have a lateral extent of travel about equal to the width of the series of ribs and locking means are provided whereby the bolt or screw may be locked in any set position within the range of its lateral travel, the expressions of position both here and elsewhere throughout the description having reference to the installed position of the structure.

In irrigating systems such as are found in the western portion of the United States and elsewhere, it is a matter of very material moment in arid regions to carefully conserve the water supply, and while each user should receive the full amount of water to which he is entitled it is important that there be no wastage, which might result in great harm to those supplied by the irrigating system.

While certain wastage such as that which occurs from seepage and evaporation cannot be avoided, the present invention practically obviates unnecessary waste because it provides for very accurate adjustment of the gates controlling diversion of water, wherefore each user is assured within very narrow limits of the amount of water to which he is entitled.

Under prevailing conditions of water distribution in irrigating systems and often because of the interjection of the human element, even though other things be equal, adjacent farms having the same surface and subsoil and raising the same kind of crops, will, at the end of the irrigation season, have used different amounts of water. Therefore, water for irrigation purposes must be sold by the acre-foot or fraction thereof, rather than by the season or in the form of a perpetual water right. Hence, when a user demands a certain flow in second feet because he thinks he needs it and is entitled to its use, the distributer is bound to give it to him. However, with the means more commonly provided the distributer has been compelled to give the user more than he demands, since the nearest adjustment of the gates possible or practicable gives too much water, wherefore the over amount is mere waste.

The present invention has to do more particularly with small head gates capable of being raised by hand and not requiring gearing in their manipulation, and the invention provides for the accurate adjustment of the amount of water supplied, which adjustments cannot be maliciously changed.

In the structure of my aforesaid patent the stem of the gate is provided with a series of inclined channels with a laterally movable set screw, the head of which enters in one of the channels and the stem of which requires manipulation by means of a screw driver or similar tool, suitable means being supplied for locking the parts after adjustment. With the present invention the stem of the gate has a series of ribs or elongated projections inclined similarly to the channels shown in the aforesaid Letters Patent, while the locking screw has been materially shortened and the locking means coacting with the screw materially simplified, the arrangement being such that accuracy of adjustment is more certainly provided than in the structure of the aforesaid patent.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified, so long as such changes and modifications come within the scope of the appended claims.

In the drawings:—

Figure 1 is a side elevation of the gate with some parts in section, and showing the gate in the partly open position.

Fig. 2 is a face view on a larger scale than Fig. 1 of a portion of the gate carrying stem and the locking means therefor.

Fig. 3 is a plan view of a portion of the structure of Fig. 1 on a larger scale than that of Fig. 2.

Fig. 4 is a section on the line 4—4 of Fig. 2, but drawn on the scale of Fig. 3.

Fig. 5 is a section on the line 5—5 of Fig. 4.

Fig. 6 is a section on the line 6—6 of Fig. 4.

Fig. 7 is a section on the line 7—7 of Fig. 4.

Fig. 8 is a front elevation of the fixed channel guide member for the nut of the locking bolt.

Fig. 9 is a perspective view of the nut.

Fig. 10 is a fragmentary view of a modification.

Referring to the drawings there is shown in Fig. 1 a more or less schematic representation of a supply canal 1, the showing including an indication of a portion of a canal bank 2 and a lateral 3, all of which need no particular description, since they may follow the customary practice. The lateral 3 is provided with a gate 4 which may be of the type adapted for hand manipulation. Rising from that portion of the lateral supplied by the gate 4 is a frame composed of side posts 5 and a top cross beam 6, which latter at a point about midway of its length has a cut-away portion or recess 7 with beveled sides 7ª approaching toward the back wall of the recess, which latter is of suitable size to receive a stem 8 similarly beveled at the edges and carrying the gate 4 at its lower end, and of a length to extend through the recess 7 when the gate is closed. The stem 8 may be of metal or wood, and has secured to it by rivets 9 or by other suitable means an elongated face plate 10 applied to that side or face of the stem 8 remote from the beam 6. The face plate 10 is formed with a longitudinal series of ribs 11 which may be parallel one to the other and extend diagonally of the plate, so as to incline with relation to and extend on opposite sides of the longitudinal center line of the stem 8, this line being upright in the installed position of the gate. Instead of the ribs being diagonally of the plate, as best shown in Fig. 2, the plate may have ribs 11ª crosswise of the plate perpendicular to the edges of the plate, as in Fig. 10. The plate 10 may conveniently be formed of sheet metal, such, for instance, as galvanized iron, with the ribs struck up from one face, so that the ribs or the spaces between represent corrugations from one face or the other of the plate, as the case may be, not only providing grooves between the ribs, but correspondingly strengthening the plate without increasing its weight. The corrugations are preferably made rounded in cross-section and between or in them are corresponding grooves or channels, which, in the case of projecting ribs, represent the spaces between the ribs and do not extend below the outer face of the plate 10 as applied to the stem 9 in the form shown in the drawings. The ribs may be so formed that their crowns are narrower and more sharply rounded than the valleys or channels between them, but this while being advantageous is not obligatory, since the ribs may be of any suitable shape which will answer the purposes of the present invention.

The spacing and length of the ribs are usually such that the distance between the crowns of two ribs on the same longitudinal center line of the stem or between the bottoms of two adjacent valleys or channels is one-tenth of a foot, while the distance across the series of ribs may be divided into ten steps, wherefore each step will represent one one-hundredth of a foot. It is to be understood, however, that any particular arrangement in these respects is not obligatory. Moreover, the corrugations and the consequent ribs or valleys, or both, may extend fully to the edges of the plate 10.

Fast to the face of the cross beam 6 having the recess 7 therein and extending across the recess is a channel member 12 having a bottom 13, which where crossing the recess 7 is provided with a longitudinal slot 14 for a purpose to be described. The channel member 12 has longitudinal sides 15 and perforations 16 near the ends of the bottom or base 13. Near one end the sides 15 are traversed by matching passages 17 for a pivot 18 by means of which a channel cover member 19 is hinged at one end to the corresponding end portion of the channel member 12, said cover 19 being of a width to telescope at the sides thereinto. The channel member 12 is made fast to the beam 6 by bolts 20 having nuts 21 at the ends within the channel member 12, said bolts traversing the holes 16 and the heads of the bolts being located at the other side of the beam as shown at 22 in Fig. 1.

One bolt 20 traverses one web of and secures an angle guard plate 23 within the fixed channel member 12 and the other bolt 20 traverses one web of and secures an angle lock plate 24 within the member 12.

The cover member 19 near the end remote from the hinge pivot 18 is provided with a transverse slot 25 for the outstanding web of the plate 24, which plate is long enough to extend through the slot 25 when the cover member is closed. The plate 24 has a passage 26 through it near its outer end to receive a suitable lock 27.

Adapted to the passage 14 is a nut 28 with oppositely directed flanges 29 at one end to bear against the inner face of the channel member 12 where bridging the recess 7. The nut 28 is traversed by the threaded stem of a set screw 30 provided at one end with a head 31 preferably of square contour, although not necessarily of such particular shape. The end of the set screw 30 remote from the head 31 is rounded so as to be more or less hemispherical, as shown at 32, to conform approximately to the rounded cross-sectional shape of the sides of the ribs 11 and the spaces or channels between them, while the extremity of the end 32 is flattened, as shown at 33, so that the bearing of the rounded end is upon the matching sides of the rib and not upon the bottoms of the valleys therebetween. This gives a more certain engagement of the set screw with the ribs.

One of the flanges 29 will be seen about flush with or a little above what constitutes the upper face of the member 12, and this flange is provided with a row of consecutive digits 34 with lead lines 35 extending to the rear edge of the upper side face of the channel member 12, and are in position to be readily read in connection with a notch or indication 29ᵃ on the then upwardly directed flange 29 of the nut 28. The ribs 11 have each a number 36, the numbers being arranged consecutively, representing certain fractional portions of a unit of measurement, such, for instance, as tenths of a foot, the numbers 34 then representing hundredths of a foot.

The head 31 of the set screw 30 is so shaped that it cannot be turned when the cover member 19 is closed, because having its diagonal diameter greater than the distance between the side members of the channel-like cover 19, but when the cover is open the head 31 may be turned because it is at a greater distance from the bottom of the channel member 12 than the width of the sides 15 of said channel member 12.

By having the head 31 of square shape it may be turned so that opposite sides of the head are substantially parallel with the sides of the cover member when the latter is closed, and, with the screw seated between two adjacent ribs or corrugations, the cover member may be closed. The parts, however, are so proportioned that when the set screw is so turned that the sides of the head are about parallel with the sides of the cover member and the end 32 of the set screw is in firm engagement with the side walls of adjacent ribs, the cover may be closed and locked, but not otherwise. This insures the proper locking of the stem and its protection against malicious change, since the set screw is then entirely covered up and inaccessible and, moreover, cannot be turned because the cover member 24 serves as a lock preventing, by engagement with the head of the set screw, turning of the latter sufficiently to loosen the stem 8.

The angle plates 23 and 24 serve as closures for the respective ends of the channel member 12 and for the channel cover 19 when the latter is closed. The plates 23 and 24 are each of a width to enter the cover member with but little clearance.

If it be assumed that the gate is closed and locked and it be desired to admit a certain flow of water into the lateral 3 controlled by the gate, an authorized person removes the lock 27 and then turns the cover 19 on the pivot bolt 18, so as to expose the interior of the channel member 12. Now the set screw 30 is turned so that its pressure upon adjacent ribs or corrugations 11 is relieved, whereupon the gate stem 8 and the gate with it may be raised, and if the set screw 30 be unscrewed to a sufficient extent, the gate may be readily opened so far as desired. Let it be assumed that the opening of the gate is to be twenty-five one-hundredths of a foot or other desired part of the adopted unit of measurement. The gate is lifted until the set screw when turned to move toward the plate 10 will enter between the chosen ribs or corrugations, which in the particular example stated are those ribs having the digits 2 and 3. Then by sliding the nut 28 lengthwise of the slot 14 until the notch 35 is opposite the number 5 on the channel member 12, the set screw is in position to lock the gate with an opening of twenty-five one-hundredths of a foot. The set screw is then screwed through the nut 28 until in firm engagement with the sides of the ribs or corrugations 2 and 3 without seating in the bottom of the channel or valley between these ribs and this turning may be performed by hand with sufficient force to lock the gate in the desired position. The screw is turned until the head 31 has opposite sides in substantially parallelism with the sides of the channel member 12, thus permitting the closing of the cover member 19 and the application of the lock 27. Now the gate is firmly locked against manipulation except by an authorized person having a proper key to the lock 27. The set screw is so housed in the cover member 24 that even though a portion of the stem on the set screw be accessible it cannot be turned sufficiently to loosen it from the gate, wherefore the gate remains firmly fixed in position. Nor is it possible to lock the gate in some intermediate position by the engagement of the set screw with the crown portion of one of the ribs, for then the cover member 19 cannot be closed. Nor can the cover member 19 be closed except when the gate is firmly locked, since a quarter turn of the set screw is sufficient to so move it away from the stem that the cover member cannot be closed.

The gates may be opened or closed to different extents by very small fractions of adjustment and the gates may be set with sufficient accuracy for all practical purposes, so that wastage because of insufficient delicacy of adjustment is reduced to a negligible minimum, or practically obviated.

In Fig. 10, where the ribs 11ª are perpendicular to the sides of the plate 10, the channel member and parts carried thereby are arranged at an angle which may correspond to the angle of the diagonal ribs shown in Fig. 2.

What is claimed is:—

1. In locking means for gates of irrigating canals, the combination with a gate having a stem provided with a longitudinal series of substantially parallel spaced ribs with intervening valleys, the spacing of the ribs being in the direction of the length of the series, and a locking device movable into and out of the valleys between any two adjacent ribs and also movable laterally of the length of the series of ribs, the height of the ribs and the extent of movement of the locking device into and out of the valleys being related to prevent engagement of the locking device on the ridge portions of the ribs.

2. A locking means for gates of irrigating canals, comprising a plate with an elongated series of inclined ribs struck up therefrom, said ribs being in substantially parallel relation one to the other with intervening valleys, and spaced apart in the direction of the length of the series, and a locking device movable into and out of the valleys between any two adjacent ribs of the series and also movable laterally of the length of the series, the height of the ribs and the extent of movement of the locking device into and out of the valleys being related to prevent engagement of the locking device on the ridge portions of the ribs.

3. A locking means for gates of irrigating canals, comprising a plate with an elongated series of ribs struck up therefrom, said ribs being in substantially parallel relation one to the other with intervening valleys, and spaced apart in the direction of the length of the series, and a locking device movable into and out of the valleys between any two adjacent ribs of the series and also movable laterally of the length of the series, said locking device comprising a set screw with means carrying it, the screw having the portion entering between the ribs rounded and also having the extremity of the rounded portion flattened, and the height of the ribs and the extent of longitudinal movement of the screw being related to prevent engagement of the screw on the ridge portions of the ribs.

4. A locking means for gates of irrigating canals comprising a member adapted to be secured to the stem of the gate and provided with a longitudinally extending series of ribs in parallel spaced relation, and a locking device therein comprising a set screw and carrying means for the set screw, said set screw being adapted to enter between any two adjacent ribs and also movable laterally of the length of the series in inclined relation to the length of the ribs and having a head of a conformation providing diameters of different lengths, and a cover member for the set screw of a width conforming to a shorter diameter of the head.

5. A locking means for gates of irrigating canals comprising a member adapted to be secured to the stem of the gate and provided with a longitudinally extended series of ribs in parallel spaced relation, and a locking device therein comprising a set screw and carrying means for the set screw, said set screw being adapted to enter between any two adjacent ribs and also movable laterally of the length of the series in inclined relation to the length of the ribs and having a head of a conformation providing diameters of different lengths, and a cover member for the set screw of a width conforming to the shorter diameter of the head, and said set screw being of a length to require the setting of the set screw between two adjacent ribs to permit the closing of the cover member.

6. The combination with a gate for irrigating canals, of an elongated member movable with the gate and provided with a longitudinal series of substantially parallel spaced ribs and intervening valleys, a set screw adapted to enter a valley between any two adjacent ribs, a carrier for the set screw provided with a nut through which the set screw is threaded and movable in the carrier transversely of the elongated series of ribs in inclined relation to the length of said ribs, and a cover member on the carrier movable into covering relation to the set screw.

7. The combination with a gate for irrigating canals, of an elongated member movable with the gate and provided with a longitudinal series of substantially parallel spaced ribs, a set screw adapted to enter between any two adjacent ribs, a carrier for the set screw provided with a nut through which the set screw is threaded and movable in the carrier transversely of the elongated series of ribs in inclined relation to the length of said ribs, and a cover member on the carrier movable into covering relation to the set screw, said set screw being provided with a head having different portions of different diameters with the cover member conforming to a shorter diameter of the set screw head.

8. The combination with a gate for irrigating canals, of an elongated member movable with the gate and provided with a longitudinal series of substantially parallel spaced ribs, a set screw adapted to enter between any two adjacent ribs, a carrier for the set screw provided with a nut through which the set screw is threaded and movable in the carrier transversely of the elongated series of ribs in inclined relation to the length of said ribs, and a cover member on the carrier movable into covering relation to the set screw, said set screw being provided with a head having different portions of different diameters with the cover member conforming to a shorter diameter of the set screw head, and said set screw being of a length and the cover member being related to the set screw whereby the set screw must be seated between two adjacent ribs before the cover member can be completely closed.

9. A locking means for gates of irrigating canals, comprising an elongated series of ribs with respect to the longitudinal center line of the series and the ribs being in substantially parallel relation to each other and spaced apart, the said series of ribs being carried by and movable with the gate, a carrying member adapted to be fixed in operative relation to the ribs, a nut on the carrying member movable transversely of the series of ribs in inclined relation to the length of said ribs, a set screw threaded through the nut with one end adapted to enter between adjacent ribs and the other end formed into a head of less width in one direction than in another direction, and a cover member movable to expose the set screw or to hide it and in the latter position having means for locking the cover member, said cover member and set screw being related to compel the seating of the set screw and the movement of the head thereof into a predetermined position to permit the closing of the cover member.

10. A locking means for gates of irrigating canals comprising an elongated series of ribs with respect to the longitudinal center line of the series and the ribs being in substantially parallel relation to each other, and spaced apart, the said series of ribs being carried by and movable with the gate, a carrying member adapted to be fixed against movement and in operative relation to the ribs, a nut on the carrying member movable transversely of the series of ribs in inclined relation to the length of said ribs, a set screw threaded through the nut with one end adapted to enter between adjacent ribs and the other end formed into a head of less width in one direction than in another direction, and a cover member movable to expose the set screw or to hide it, and in the latter position having means for locking the cover member, said cover member and set screw being related to compel the seating of the set screw and the movement of the head thereof into a predetermined position to permit the closing of the cover member, the nut and the member carrying the nut having indicating means, and the ribs also having indicating means for showing fractional adjustments of the gate with respect to a predetermined unit of movement.

In testimony that I claim the foregoing as my own I have hereto affixed my signature in the presence of two witnesses.

FREDERICK N. CRONHOLM.

Witnesses:
J. W. MURPHY,
EMMA M. McDONOUGH.

Copies of this patent may be obtained for five cents each, by addressing the "Commissioner of Patents, Washington, D. C."